(12) United States Patent
Pierro et al.

(10) Patent No.: US 6,301,531 B1
(45) Date of Patent: Oct. 9, 2001

(54) VEHICLE MAINTENANCE MANAGEMENT SYSTEM AND METHOD

(75) Inventors: Michael James Pierro; William Roy Schneider, both of Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/378,939

(22) Filed: Aug. 23, 1999

(51) Int. Cl.$^7$ .............................. G06F 7/00; G06F 17/00
(52) U.S. Cl. ................... 701/29; 701/33; 701/19
(58) Field of Search ................... 701/29, 33, 19

(56) References Cited

U.S. PATENT DOCUMENTS

| | | | |
|---|---|---|---|
| 5,157,610 | * 10/1992 | Asano et al. ........................... | 701/32 |
| 5,566,091 | * 10/1996 | Schricker et al. ..................... | 702/34 |
| 5,815,071 | * 9/1998 | Doyle ................................... | 340/439 |
| 5,845,272 | 12/1998 | Morjaria et al. | |
| 5,950,147 | * 9/1999 | Sarangapani et al. ............... | 702/179 |
| 6,185,934 | * 1/2001 | Hershey et al. ....................... | 714/25 |

OTHER PUBLICATIONS

"System and Method for Remote Inbound Vehicle Inspection," Michael J. Pierro et al., Serial No. 09/378,940 (GE docket 20–LC–1929) filed Aug. 23, 1999.

* cited by examiner

Primary Examiner—Michael J. Zanelli
(74) Attorney, Agent, or Firm—Carl A. Rowold; Jill M. Breedlove

(57) ABSTRACT

An apparatus and method of predicting vehicle breakdown and operability includes monitoring at a monitoring station on-board systems parameter data transmitted from a vehicle from a remote location; determining whether any of the monitored data is out of a predetermined range; calculating trends for monitored data determined to be out of range; identifying any system fault; and predicting what vehicle system(s) must be corrected to avoid vehicle failure and when such system(s) are likely to fail unless corrected.

11 Claims, 2 Drawing Sheets

VEHICLE MAINTENANCE MANAGEMENT SYSTEM AND METHOD

BACKGROUND OF THE INVENTION

This invention relates to methods and apparatus for predicting breakdowns of vehicles, such as locomotives.

A locomotive is a complex electromechanical vehicle comprised of several complex systems. Each of these systems is built from components which over time may fail. When a component does fail, it is difficult to identify the failed component because the effects or problems that the failure has on the system are often neither obvious in terms of their source nor unique. The ability to automatically diagnose problems that have occurred or will occur in the locomotive systems has a positive impact on minimizing locomotive downtime.

Previous attempts to diagnose problems occurring in a locomotive have been performed by experienced personnel who have in-depth individual training and experience in working with locomotives. Typically, these experienced individuals use available information that has been recorded in a log. Looking through the log, the experienced individuals use their accumulated experience and training in mapping incidents occurring in locomotive systems to problems that may be causing the incidents. If the incident-problem scenario is simple, then this approach works fairly well. However, if the incident-problem scenario is complex, then it is very difficult to diagnose and correct any failures associated with the incidents.

Currently, computer-based systems are being used to automatically diagnose problems in a locomotive in order to overcome some of the disadvantages associated with relying completely on experienced personnel. Typically, a computer-based system utilizes a mapping between the observed symptoms of the failures and the equipment problems using techniques such as table look ups, a symptom-problem matrices, and production rules. These techniques work well for simplified systems having simple mappings between symptoms and problems. However, complex equipment and process diagnostics seldom have such simple correspondences. In addition, not all symptoms are necessarily present if a problem has occurred, thus making other approaches more cumbersome.

The above-mentioned approaches either take a considerable amount of time before failures are diagnosed, or provide less than reliable results, or are unable to work well in complex systems. There is a need to be able to quickly and efficiently determine the cause of any failures occurring in the locomotive systems, while minimizing the need for human intervention.

U.S. Pat. No. 5,845,272 discloses an on-board locomotive diagnostic system. The system is useful for identifying locomotive systems problems and proposing remedial measures to repair or correct the problems. On-board diagnostic systems, however, do not presently communicate with a rail carrier's maintenance or scheduling centers. Consequently, those centers do not have direct access to systems data from remote locomotives which would be helpful in optimizing locomotive maintenance scheduling and route planning while minimizing locomotive downtime arising from unexpected breakdowns.

Accordingly, it is especially desirable to avoid faults resulting in unscheduled shutting down or slowing down vehicle operation, since such shutdowns or slowdowns are costly and highly inconvenient.

It is also desirable to provide a way of predicting faults and dealing with predicted faults before they occur.

BRIEF SUMMARY OF THE INVENTION

In one aspect, the present invention comprises a method of predicting vehicle breakdown comprising monitoring at a monitoring station on-board systems parameter data transmitted from a vehicle from a remote location; determining whether any of the monitored data is out of a predetermined range; calculating trends for monitored data determined to be out of range; identifying any system fault; and predicting which, if any, locomotive system(s) must be corrected to avoid vehicle failure and when such system(s) is/are likely to fail unless corrected. The method can predict either operating distance or operating time prior to failure.

In another aspect, the invention comprises an apparatus for determining vehicle operability comprising: (a) a monitoring station for monitoring on-board system parameter data transmitted from a vehicle from a remote location; and (b) a processor adapted to determine whether any of the monitored data is out of a predetermined range, calculate trends for monitored data determined to be out of range, and predict which, if any, vehicle system(s) must be corrected to avoid vehicle failure and when such system(s) are likely to fail unless corrected.

DETAILED DESCRIPTION OF THE INVENTION

While this invention applies to any vehicle which has complex systems subject to breakdown, it will be illustrated with reference to locomotives.

Figure 1:
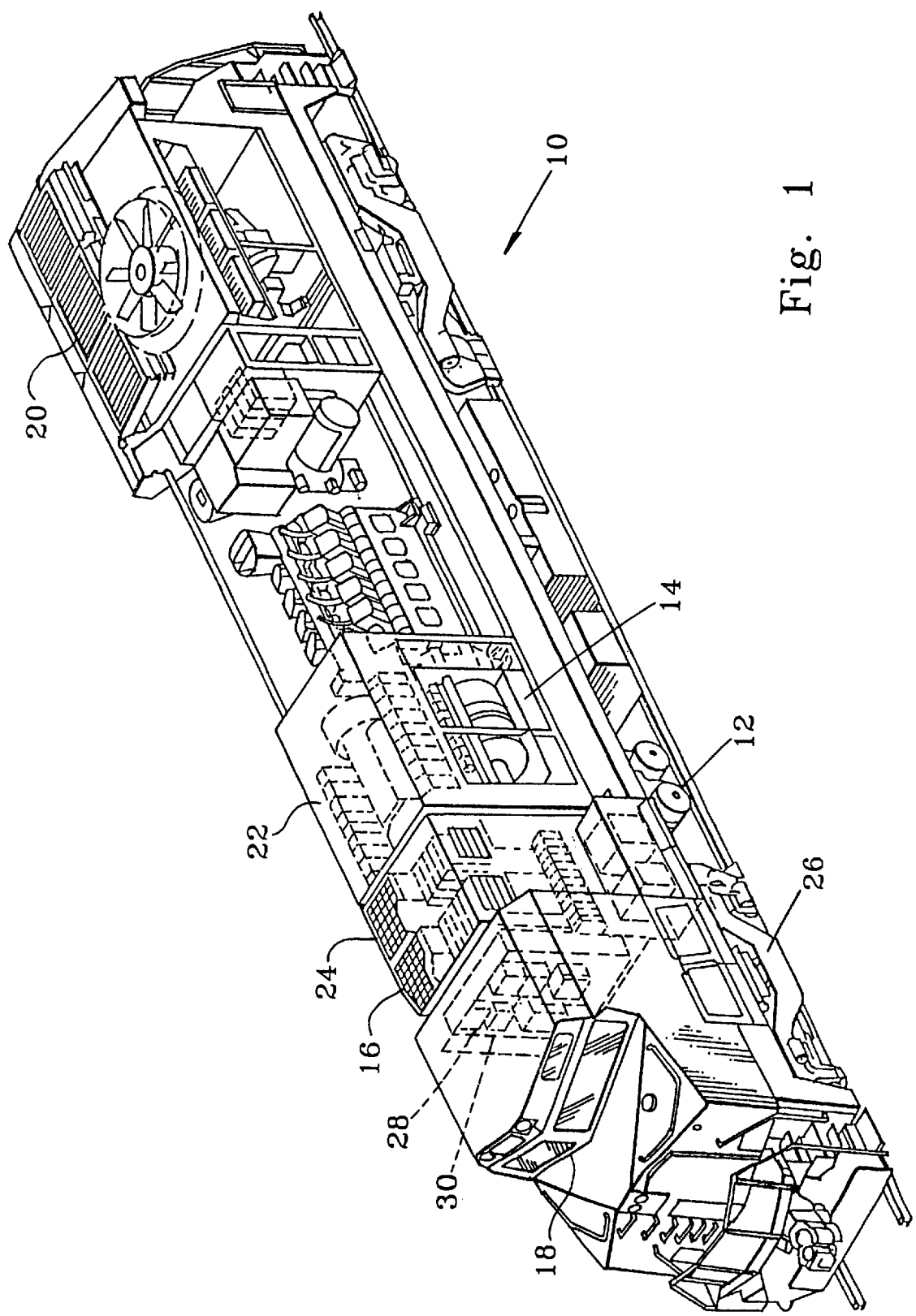
FIG. 1 shows a schematic of a locomotive.

FIG. 1 shows a schematic of an exemplary locomotive 10. The locomotive may be either an AC or DC locomotive. The locomotive 10 is comprised of several complex systems, each performing separate functions. Some of the systems and their functions are listed below. Note that the locomotive 10 is comprised of many other systems and that the present invention is not limited to the systems disclosed herein.

An air and air brake system 12 provides compressed air to the locomotive, which uses the compressed air to actuate the air brakes on the locomotive and cars behind it.

An auxiliary alternator system 14 powers all auxiliary equipment. In particular, it supplies power directly to an auxiliary blower motor and an exhauster motor. Other equipment in the locomotive is powered through a cycle skipper.

A battery and cranker system 16 provides voltage to maintain the battery at an optimum charge and supplies power for operation of a DC bus and a HVAC system.

An intra-consist communications system collects, distributes, and displays consist data across all locomotives in the consist.

A cab signal system 18 links the wayside to the train control system. In particular, the system 18 receives coded signals from the rails through track receivers located on the front and rear of the locomotive. The information received is used to inform the locomotive operator of the speed limit and operating mode.

A distributed power control system provides remote control capability of multiple locomotive consists anywhere in the train. It also provides for control of tractive power in motoring and braking, as well as air brake control.

An engine cooling system 20 provides the means by which the engine and other components reject heat to the cooling water. In addition, it minimizes engine thermal cycling by maintaining an optimal engine temperature throughout the load range and prevents overheating in tunnels.

An end of train system provides communication between the locomotive cab and last car via a radio link for the purpose of emergency braking.

An equipment ventilation system 22 provides the means to cool the locomotive equipment.

An event recorder system records FRA required data and limited defined data for operator evaluation and accident investigation. It can store up to 72 hours of data, for example.

A fuel monitoring system provides means for monitoring the fuel level and relaying the information to the crew.

An exemplary global positioning system uses NAVSTAR satellite signals to provide accurate position, velocity and altitude measurements to the control system. In addition, it also provides a precise UTC reference to the control system.

A mobile communications package system provides the main data link between the locomotive and the wayside via a 900 MHz radio.

A propulsion system 24 provides the means to move the locomotive. It also includes the traction motors and dynamic braking capability. In particular, the propulsion system 24 receives power from the traction alternator and through the traction motors converts it to locomotive movement.

A shared resources system includes the I/0 communication devices, which are shared by multiple systems.

A traction alternator system 26 converts mechanical power to electrical power which is then provided to the propulsion system.

A vehicle control system reads operator inputs and determines the locomotive operating modes.

The above-mentioned systems are monitored by a locomotive control system 28. The locomotive control system 28 keeps track of any incidents occurring in the systems with an incident log. Locomotive 10 may optionally include an on-board diagnostic system 30 similar to that described in U.S. Pat. No. 5,845,272.

Figure 2:
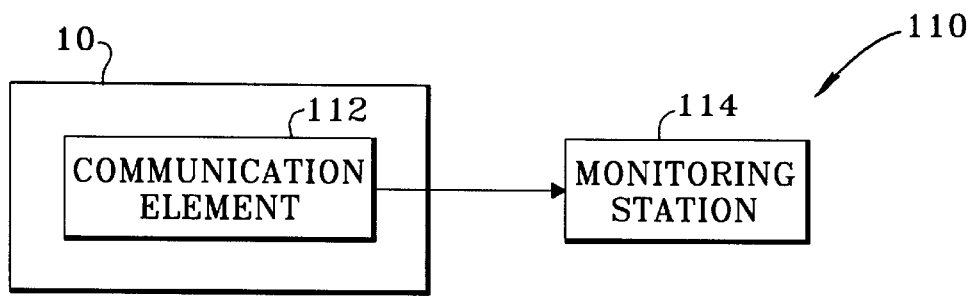
FIG. 2 is a block diagram of a system according to the invention for predicting breakdown of complex vehicles.

FIG. 2 generally illustrates in block diagram a system according to preferred embodiments of the invention for predicting vehicle operability or breakdown comprising monitoring at a monitoring station on-board systems parameter data transmitted from a vehicle from a remote location; determining whether any of the monitored data is out of a predetermined range; calculating trends for monitored data determined to be out of range; identifying any system fault; and predicting which, if any, locomotive system(s) must be corrected to avoid vehicle failure and when such system(s) are likely to fail unless corrected.

Figure 3:
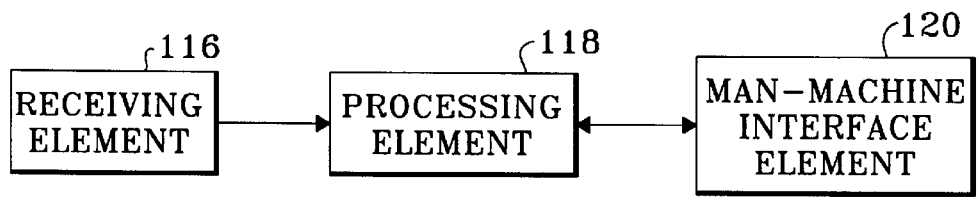
FIG. 3 is a block diagram of the monitoring station apparatus of the system shown in FIG. 2.

The system, generally identified by numeral 110, comprises a communication element(s) 112 and a monitoring station 114. Communication element(s) 112 are carried by a remote vehicle such as locomotive 10. The communication element(s) may comprise a cellular modem, a satellite transmitter or similar well-known means or methods for conveying wireless signals over long distances. Signals transmitted by communication element 112 are received by monitoring station 114 which, for example, may be a maintenance facility or routing facility for a railroad. Monitoring station 114 includes appropriate hardware and software for receiving and processing vehicle system parameter data signals generated by locomotive 10 from a remote location. Such equipment, as illustrated in block diagram form in FIG. 3, comprises receiving element 116, processing element 118, and man-machine interface element 120.

Examples of suitable receiving element 116 include a satellite communications receiver or cellular communications receiver. Processing element 118 may comprise a processor, memory and modem or Integrated Services Digital Network (ISDN) adapter of a conventional personal computer or workstation coupled with software capable of executing the functions represented in FIG. 4. Suitable processing element 118 may comprise the locomotive failure system described in U.S. Pat. No. 5,845,272. Man-machine interface element 120 may include a monitor, keyboard, mouse, printer and/or other related I/O devices for enabling interaction between a human operator and processing means 118. Monitored vehicle parameter data received by receiving means 116 is communicated to processing element 118 wherein it is processed in the manner shown in FIG. 4.

Many vehicle system operating parameters are monitored, and trends are calculated on a subset of those parameters, or on all of the parameters. Among the parameters which are usually monitored for locomotives are ambient air temperature, train notch, total track and force power, total voltage, total amps, software versions, engine RPM, engine temperature, crankcase pressure, dynamic braking, battery voltage, and voltage and amperage for all auxiliary motors. For other vehicles, other sets of parameters may be monitored.

Figure 4:
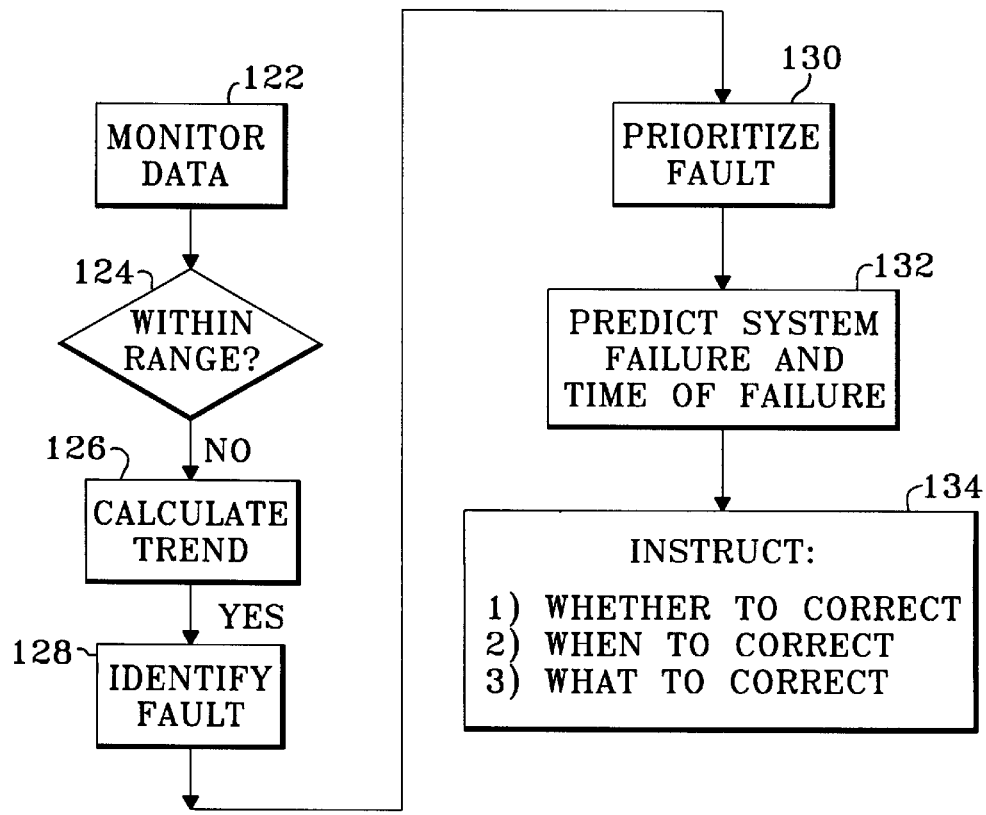
FIG. 4 is a block diagram of a preferred vehicle maintenance management method according to the invention.

Referring to FIG. 4, there is shown a block diagram of the operations performed by processing element 118 upon receipt of vehicle systems parameter data transmitted by communication element 112. Upon issuance of a transmission request from monitoring station 114, communication element 112 preferably continuously transmits the data and receiving element 116 preferably continuously receives the data. Using receiving element 116, processing element 118 monitors the data as indicated at 122. A first determination 124 made by processing element 118 is whether any of the data is outside of an acceptable range for any of the vehicle systems being monitored. If the processing element identifies out-of-range data, it executes a routine 126 to calculate whether the data suggests one or more trends suggestive of possible or actual impairment or failure of the vehicle systems being monitored.

The trends are calculated by comparing values for a given parameter over a period of time and comparing those values with historical data for identical vehicle systems. This enables rapid and accurate correlation of trending data with a dedicated fault occurrence experience database. The trends are preferably calculated based in part on prior downloads collected in the database. The database is preferably continually updated and may be stored in the memory of processing element 118, elsewhere at the monitoring station 114, or off-site whereby it may be accessed on-line.

An example of a trend which may indicate a system fault would be a crankcase overpressure trend from negative to positive. Such a condition may be suggestive of a cylinder or piston problem or excessive engine wear. Processing element 118 is preferably capable of linking the results of several observed trends to more precisely diagnose a problem. For instance, the aforementioned crankcase overpressure trend may be coupled by processing element 118 with an observed trend in electronic fuel injection parameters to more clearly determine the cause of the problem.

Once an unfavorable trend is detected it is identified by processing element 118 with a stored fault code as indicated at 128. Fault codes corresponding to a wide variety of faults may be stored, and trends may be calculated for some or all of them. Examples of categorizable faults may include, without limitation, overcurrents, flashovers, crankcase overtemperatures, crankcase overpressures, communication failures, electrical ground failures, air conditioner converter failures, propulsion system faults, auxiliary system faults, propulsion motor faults, auxiliary motor faults, auxiliary system charging faults, engine cooling system faults, oil system faults, control wiring faults, and microelectronics faults.

As indicated at 130, following identification and categorization of a fault, processing element 118 then prioritizes the fault. The fault prioritization process involves comparing the identified fault code with a historical fault database whereby the fault may be classified as critical, restrictive, or both critical and restrictive. A critical fault is one which will cause imminent vehicle shutdown if not immediately corrected. Examples include, without limitation, serious engine problems, main and auxiliary alternator grounds, coolant or oil pressure loss and microelectronics failures. A restrictive fault is one which, although not likely to cause imminent vehicle shutdown, impedes vehicle performance. A restrictive fault is likely to become progressively worse and may degenerate into a critical fault if not timely addressed. Examples of restrictive faults include, without limitation, an overheated engine or the loss of one or more traction motors, each of which deplete horsepower and may cause other strain on the engine or other systems of the vehicle.

After a fault has been prioritized, processing element 118, as indicated at 132, predicts which vehicle system is likely to fail. Additionally, processing element also predicts the estimated time of failure, preferably expressed as an approximation of the distance (in miles or kilometers, for example) the vehicle can be safely operated before it must be shopped prior to failure or the amount of operating time prior to failure. The optimum time the vehicle should be shopped is determined by resorting to the relevant trend data for the identified fault and comparing that data with a projected time-of-failure knowledge base which has been inputted into the database for the calculation.

As indicated at 134, processing element 118 is also preferably programmed to instruct a human operator at monitoring station 114: (1) whether to correct the fault prior to scheduled maintenance of the vehicle, (2) when to correct the fault, (3) what fault to correct (preferably including what parts or components of the vehicle to repair), and (4) the optimal facility at which to correct the fault. The optimal repair facility is dependent upon the proximity of the vehicle to a facility and whether the facility has the capability, including parts and expertise, to repair the fault.

The invention has been described with reference to several embodiments; however, it will be appreciated that variations and modifications can be effected by a person of ordinary skill in the art without departing from the scope of the invention.

What is claimed is:

1. A method of predicting vehicle breakdown comprising:
   (a) monitoring at a monitoring station on-board systems parameter data transmitted from a vehicle from a remote location;
   (b) determining whether any of the monitored data transmitted from the vehicle is out of a predetermined range;
   (c) comparing monitored data transmitted from the vehicle with historical data for similar vehicles;
   (d) establishing trends in the monitored data relative to the historical data and, if unfavorable, associating the trends with a fault code;
   (e) comparing the fault code for the vehicle with historical fault code data for similar vehicles to prioritize the fault; and
   (f) predicting which, if any, vehicle system(s) must be corrected to avoid vehicle failure and when such system(s) are likely to fail unless corrected.

2. The method according to claim 1 wherein the monitored data is transmitted from a vehicle by a cellular modem or via satellite assisted communications.

3. The method according to claim 1 wherein step (f) includes approximating the distance or the operating time the vehicle can be safely operated before it must be shopped prior to failure.

4. The method according to claim 1 further comprising determining whether said vehicle system to be corrected is a critical or restrictive fault.

5. The method according to claim 1 wherein the monitored data comprise one or more systems parameter data selected from the group consisting of ambient air temperature, train notch, total track and force power, total voltage, total amps, software versions, engine RPM, engine temperature, crankcase pressure, dynamic braking, battery voltage, and voltage and amperage for all auxiliary motors.

6. The method according to claim 1 wherein the trends are calculated based at least in part on prior downloads of vehicle systems parameter data collected in a database.

7. A method of predicting vehicle breakdown comprising:
   (a) monitoring at a monitoring station on-board systems parameter data transmitted from a vehicle from a remote location;
   (b) determining whether any of the monitored data is out of a predetermined range;
   (c) calculating trends for monitored data determined to be out of range;
   (d) predicting which, if any, vehicle system(s) must be corrected to avoid vehicle failure and when such system(s) are likely to fail unless corrected; and
   (e) determining the optimum time and place the vehicle should be shopped.

8. A method of predicting vehicle breakdown comprising:
   (a) monitoring at a monitoring station on-board systems parameter data transmitted from a vehicle from a remote location;
   (b) determining whether any of the monitored data is out of a predetermined range;
   (c) calculating trends for monitored data determined to be out of range;
   (d) predicting which, if any, vehicle system(s) must be corrected to avoid vehicle failure and when such system(s) are likely to fail unless corrected; and
   (e) assigning at least one fault code corresponding to at least one system fault, the at least one fault code is selected from the group consisting of overcurrents, flashovers, crankcase overtemperatures, crankcase overpressures, communication failures, electrical ground failures, air conditioner converter failures, propulsion system faults, auxiliary system faults, propulsion motor faults, auxiliary motor faults, auxiliary system charging faults, engine cooling system faults, oil system faults, control wiring faults, and microelectronics faults.

9. A method of predicting vehicle breakdown comprising:
(a) monitoring at a monitoring station on-board systems parameter data transmitted from a vehicle from a remote location;
(b) determining whether any of the monitored data is out of a predetermined range;
(c) calculating trends for monitored data determined to be out of range;
(d) predicting which, if any, vehicle system(s) must be corrected to avoid vehicle failure and when such system(s) are likely to fail unless corrected; and
(e) identifying one or more system faults and determining whether to correct the fault prior to scheduled maintenance of the faulty system, when to correct the fault, what fault to correct, and the optimal facility at which to correct the fault.

10. A method of determining vehicle operability comprising:
monitoring at a monitoring station on-board systems parameter data transmitted from a vehicle from a remote location, the monitored data comprising one or more systems parameter data selected from the group consisting of ambient air temperature, train notch, total track and force power, total voltage, total amps, software versions, engine RPM, engine temperature, crankcase pressure, dynamic braking, battery voltage, and voltage and amperage for auxiliary motors;
determining whether any of the monitored data is out of a predetermined range;
calculating trends for monitored data determined to be out of range based in part on prior downloads of vehicle systems parameter data collected in a database accessible by the monitoring station;
identifying at least one system fault code corresponding to the at least one system fault selected from the group consisting of overcurrents, flashovers, crankcase overtemperatures, crankcase overpressures, communication failures, electrical ground failures, air conditioner converter failures, propulsion system faults, auxiliary system faults, propulsion motor faults, auxiliary motor faults, auxiliary system charging faults, engine cooling system faults, oil system faults, control wiring faults, and microelectronics faults;
determining whether the at least one system fault is critical, restrictive, or both critical and restrictive; and
predicting which, if any, vehicle system(s) must be corrected to avoid vehicle failure and when such system(s) are likely to fail unless corrected and the approximate distance or time vehicle can be safely operated before it must be shopped prior to failure.

11. A system for determining vehicle operability comprising:
(a) a monitoring device for gathering on-board systems parameter data from the vehicle;
(b) a transmitter associated with the vehicle for transmitting the data to a remote location;
(c) a receiver at the remote location for receiving the data;
(d) at least one processor for storing the data received over time from the vehicle;
(e) memory at the remote location;
(f) a data base of historical data for similar vehicles for establishing trends;
(g) a data base of historical fault code data; and
(h) at least one processor determining whether any of the monitored data transmitted from the vehicle is out of a predetermined range, comparing monitored data transmitted from the vehicle with historical data for similar vehicles, establishing trends in the monitored data relative to the historical data and, if favorable, associating the trends with a fault code and comparing the fault code with the historical fault code data to prioritize the fault and predicting which vehicle system, if any, must be corrected and when such system is likely to fail.

* * * * *